March 6, 1934. C. C. SINGER 1,950,329
AUTOMOBILE VENTILATOR
Filed April 21, 1933
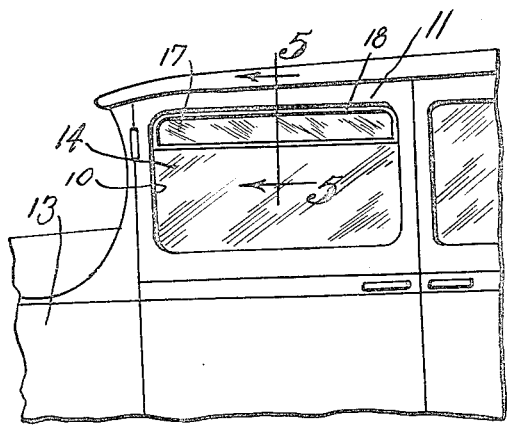
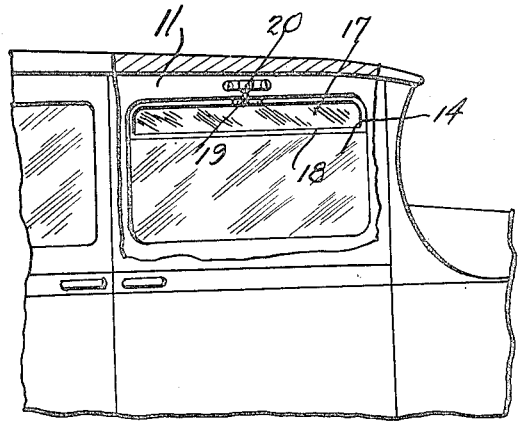
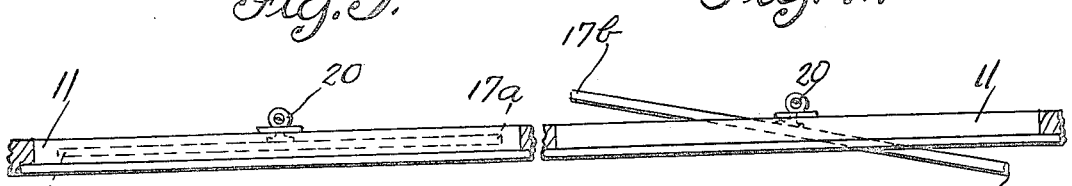
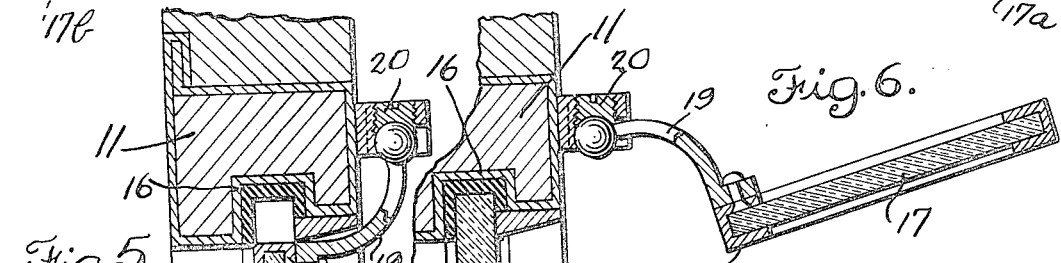
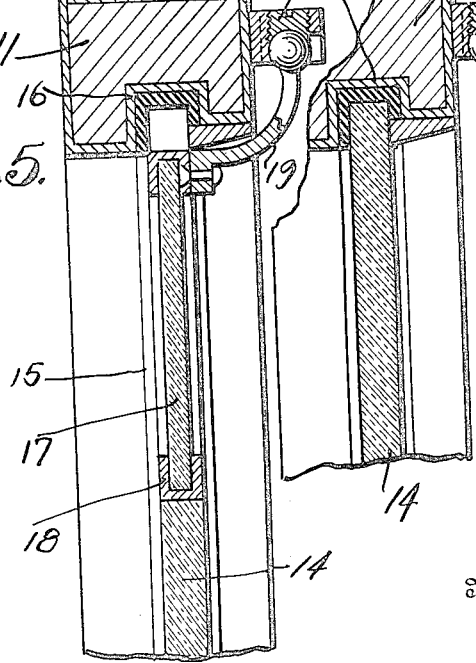
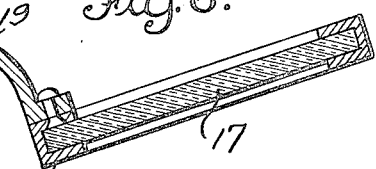
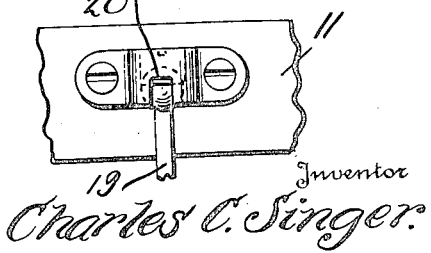
Inventor
Charles C. Singer.
By T. A. Bryant,
Attorney.

Patented Mar. 6, 1934

1,950,329

UNITED STATES PATENT OFFICE 1,950,329

AUTOMOBILE VENTILATOR

Charles C. Singer, Trenton, N. J.

Application April 21, 1933, Serial No. 667,293

3 Claims. (Cl. 98—2)

This invention relates to certain new and useful improvements in automobile ventilators.

The primary object of the invention is to provide an automobile ventilator in the form of an adjustably mounted shield or wind baffle to be associated with a restricted area of the window opening of an automobile car door to create ventilation by the outflow of air from the interior of a closed automobile in a manner simulating a vacuum condition.

A further object of the invention is to provide a vacuum ventilator of the foregoing character wherein a ventilator strip formed of glass and having a universal mounting may be carried by any part of the automobile in proximity to a door window opening, or be carried by the door and movable therewith to occupy a position at the upper end of the door window opening and capable of adjustment to cause the outflow of air from the interior of a closed automobile, the ventilator device or glass strip being positioned in the door window opening and engaged by the upper edge of the window for cooperation therewith to provide a complete glass closure for the window opening, or to be carried interiorly of the automobile when out of use, if desired.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary side elevational view of an automobile window ventilator constructed in accordance with the present invention, the same being illustrated within the door window opening and cooperating with the usual glass to provide a complete closure for the door window opening;

Figure 2 is a fragmentary side elevational view, partly broken away and illustrating the universal mounting for the ventilator strip;

Figure 3 is a detail sectional view showing the ventilator strip lying within the plane of the car door window opening;

Figure 4 is a detail sectional view, similar to Figure 3, showing the ventilator strip shifted to a position to create outflow of air from a closed automobile body;

Figure 5 is an enlarged detail sectional view taken on line 5—5 of Figure 1, showing the glass ventilator strip set into the opening of the door window and cooperating with the usual closure glass to provide a complete closure for the door window opening;

Figure 6 is a detail sectional view, similar to Figure 5, with the ventilator strip shifted inwardly of the car body out of the door window opening; and Figure 7 is a fragmentary elevational view of the universal or ball and socket mounting for the ventilator strip.

Referring more in detail to the accompanying drawing, the ventilator device for automobiles is illustrated as associated with the window opening 10 of the door 11 of the automobile 13, the window opening 10 being provided with the usual slide glass closure 14 slidable in the side stiles 15 of the door frame with the upper edge of the glass plate 14 receivable in the packed channel 16 of the door providing a complete closure for the window opening 10.

The ventilator device comprises an elongated comparatively narrow glass strip or panel 17 suitably bound at its marginal edges as at 18 and the ventilator panel 17 while capable of being mounted upon a part of the automobile convenient to the door 11 is illustrated as attached to said door by means of an arcuate bracket arm 19 that has a universal or ball and socket joint 20 located at the inner side of the door 11 and preferably midway the opposite side edges thereof.

When the closure window 14 for the window opening 10 is partially lowered, the ventilator glass panel 17 may be moved upon its bracket mountings 19 and 20 to be located within the plane of the window opening 10 above the upper edge of the glass closure 14 and when so disposed, the glass closure 14 is raised as shown in Figures 1 and 5 to have its upper edge engaged with the lower bound edge 18 of the ventilator panel 17.

To obtain proper ventilation within the car body and by vacuum action causing air within the car body to flow outwardly thereof, the ventilator glass panel 17 is shifted upon its universal mounting 20 to the position shown in Figure 4 with the forward edge 17a thereof projecting into the car body while the rear edge 17b projects exteriorly of the car body and during movement of the automobile, a substantial vacuum is created to cause air within the car body to flow outwardly thereof to produce perfect ventilation within the closed body of an automobile in the absence of all drafts. The ventilator device having the panel 17 thereof formed of glass may remain within the window opening 10 with the upper edge of the closure glass 14 engaged with the lower edge of the panel to provide a complete closure for the window opening and without interfering with vision through the window, but if desired, the ventilator panel 17 may be shifted to a position interiorly of the car body as illustrated in Figure 6 with the closure glass 14 completely closing the window opening 10. Also, the degree of ventilation may be controlled by the angularity of the ventilator panel, the ball and socket or universal mounting of the panel permitting unlimited adjustment thereof.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. In a ventilator of the character described, the combination with the window opening, of an automobile door, of a ventilator panel strip movable into and out of the opening at the upper end thereof to cooperate with the door window to provide a complete closure for the window opening and said ventilator panel being shiftable to have its forward end project into the body of the automobile and its rear end project outwardly thereof whereby air flows outwardly of the automobile body in the absence of draft, and a universal mounting for the ventilator strip.

2. In a ventilator of the character described, the combination with the window opening, of an automobile door, of a ventilator panel strip movable into and out of the opening at the upper end thereof to cooperate with the door window to provide a complete closure for the window opening and said ventilator panel being shiftable to have its forward end project into the body of the automobile and its rear end project outwardly thereof whereby air flows outwardly of the automobile body in the absence of draft, and a universal mounting for the ventilator strip, comprising an arcuate arm and ball and socket joint attached to a part of the automobile.

3. In a ventilator of the character described, the combination with the window opening, of an automobile door, of a ventilator panel strip movable into and out of the opening at the upper end thereof to cooperate with the door window to provide a complete closure for the window opening and said ventilator panel being shiftable to have its forward end project into the body of the automobile and its rear end project outwardly thereof whereby air flows outwardly of the automobile body in the absence of draft, and a universal mounting for the ventilator strip, comprising an arcuate arm and ball and socket joint attached to the door of the automobile and movable therewith.

CHARLES C. SINGER.